United States Patent [19]
Mott

[11] 3,729,279
[45] Apr. 24, 1973

[54] SPINNERETTE WITH HEAD FILTER

[76] Inventor: Lambert H. Mott, c/o Mott Metallurgical Corp., P. O. Drawer L, Farmington Industrial Park, Farmington, Conn. 06032

[22] Filed: June 24, 1971

[21] Appl. No.: 156,424

[52] U.S. Cl. .................... 425/198, 210/315, 210/338
[51] Int. Cl. .......................... D01d 3/00, D29f 3/00
[58] Field of Search ...................... 425/197–199; 210/314, 315, 317, 318, 323, 338, 448, 450, 451, 489, 490, 491, 496

[56] References Cited

UNITED STATES PATENTS

| | | | |
|---|---|---|---|
| 3,570,059 | 3/1971 | Mott | 425/198 X |
| 2,042,564 | 6/1936 | Sweetland | 210/448 X |
| 1,218,738 | 3/1917 | Zahm | 210/323 X |
| 2,925,913 | 2/1960 | Wheeler | 210/323 |
| 3,524,548 | 8/1970 | McDonald et al. | 210/323 X |

Primary Examiner—J. Spencer Overholser
Assistant Examiner—Michael O. Sutton
Attorney—Peter L. Tailer

[57] ABSTRACT

The central cavity of a spinnerette head assembly for the extrusion of synthetic polymer fibers is substantially filled by a filter element having a filter disk and upstanding concentric rings extending upward from the disk within the central cavity, the filter area presented to inflowing plastic being at least twice the cross-sectional area of the cavity and the concentric rings occupying at least 45 per cent of the volume of the cavity, the filter element containing concentric circles of closely spaced upward outflow bores extending through the filter disk to the upper portions of the concentric rings.

4 Claims, 6 Drawing Figures

Patented April 24, 1973
3,729,279
2 Sheets-Sheet 1
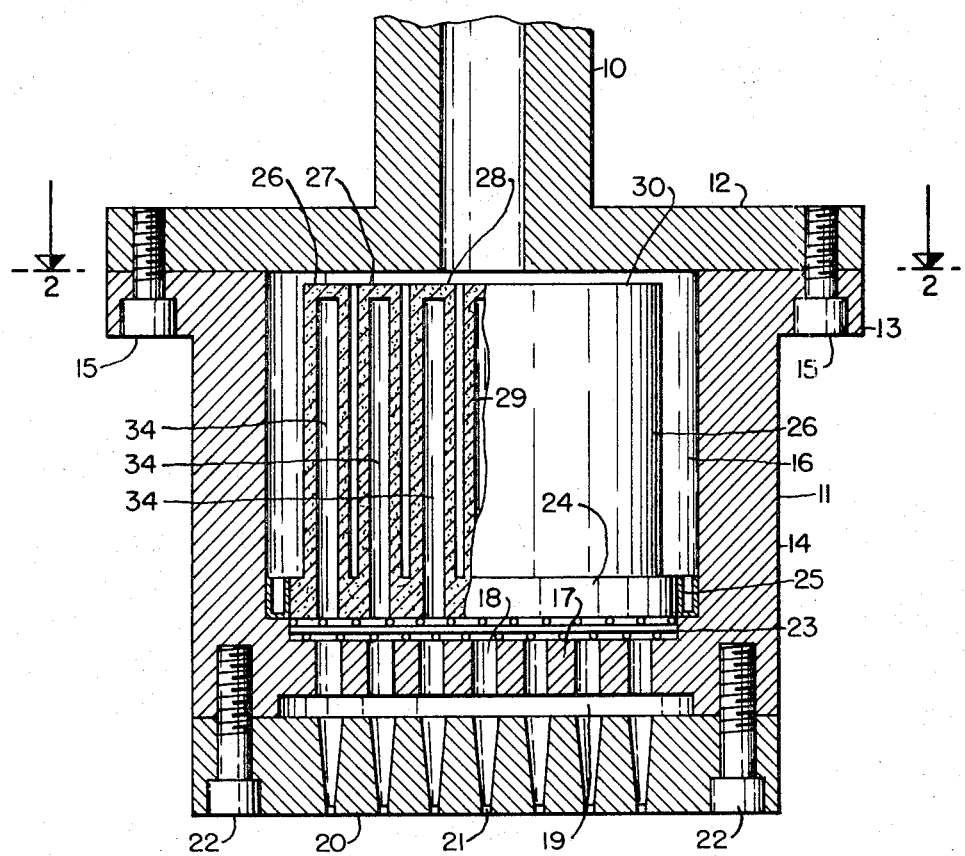
Fig. 1.
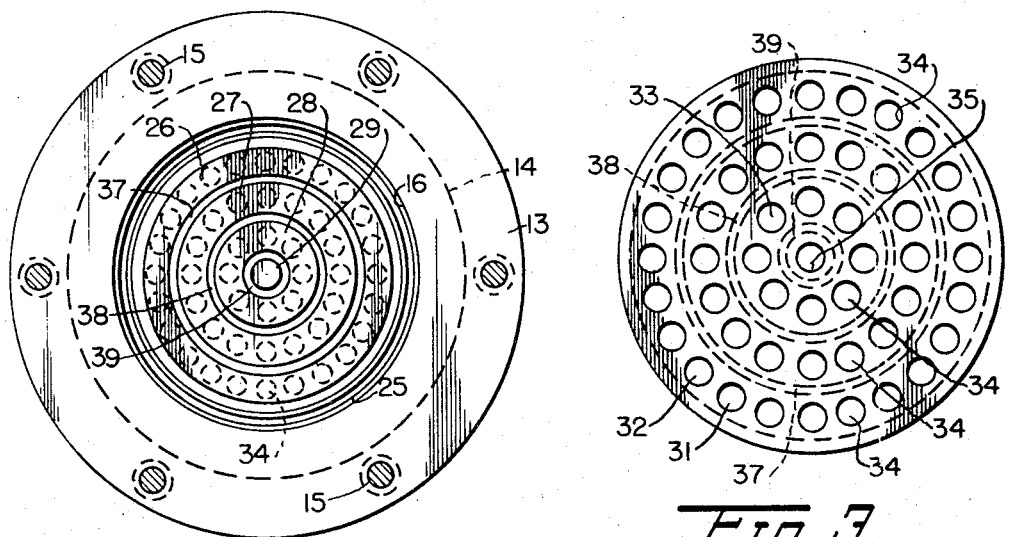
Fig. 2.
Fig. 3.
INVENTOR:
LAMBERT H. MOTT
BY Peter L. Tailer
ATTORNEY.

Patented April 24, 1973 3,729,279

INVENTOR:
LAMBERT H. MOTT

BY Peter S. Taylor

ATTORNEY.

SPINNERETTE WITH HEAD FILTER

BACKGROUND OF THE INVENTION

A conventional spinnerette head assembly for the extrusion of synthetic polymer fibers contains a large central cavity into which plastic material is forced at extrusion pressures. A spinnerette disk is fixed to the spinnerette head assembly and contains small extrusion orifices through which individual fiber strands are extruded. A porous filter is usually placed in the cavity in front of the the spinnerette disk to filter foreign particles from the plastic and prevent clogging of the extrusion apertures. The porous filter also serves to condition the plastic for extrusion as it shears lumps or inconsistencies in the plastic passing through it. In many cases marbles or sand are placed in the cavity behind the conventional flat filter to reduce the effective volume of the cavity and prevent the stagnation and degredation of plastic therein. This invention provides a superior spinnerette head assembly filter.

SUMMARY OF THE INVENTION

A spinnerette head assembly for the extrusion of synthetic polymer fibers has a cup shaped holder containing a central cavity, a bottom wall of said holder containing passages, a spinnerette disk contining extrusion orifices fixed below said bottom wall, means introducing plastic at extrusion pressures into said holder, and a filter element having a disk sealed in said cavity above said bottom wall, said filter element having concentric rings integrally formed with said filter disk and upstanding therefrom to substantially fill said central cavity, said filter element containing concentric circles of closely spaced upward extending bores for the outflow of filtered and conditioned material, said bores extending through said disk to the upper portions of said concentric rings. The area of the concentric rings is at least twice the cross-sectional area of the cavity and the volume of the concentric rings above the filter disk within the cavity is at least 45 per cent the volume of the central cavity above the filter disk.

Since the upstanding concentric rings substantially fill the central cavity of the spinnerette head assembly, sand or marbles need not be used for this purpose. In addition, the concentric rings present a much larger area for filtering purposes with a given thickness for a flow path so that, with a given pore size, a longer service life before clogging results. The concentric ring construction of the filter element of this invention provides a stronger filter that more thoroughly fills the central cavity than does the filter shown in my U.S. Pat. No. 3,570,059.

BRIEF DESCRIPTION OF THE DRAWING

FIG. 1 is a longitudinal section through a spinnerette head assembly showing a filter therein according to a first embodiment of my invention, the filter being partly broken away in section;

FIG. 2 is a section taken on line 2—2 of FIG. 1;

FIG. 3 is a bottom view of the filter element shown in the spinnerette head assembly in FIG. 1;

DESCRIPTION OF THE PREFERRED EMBODIMENTS

Figure 4:
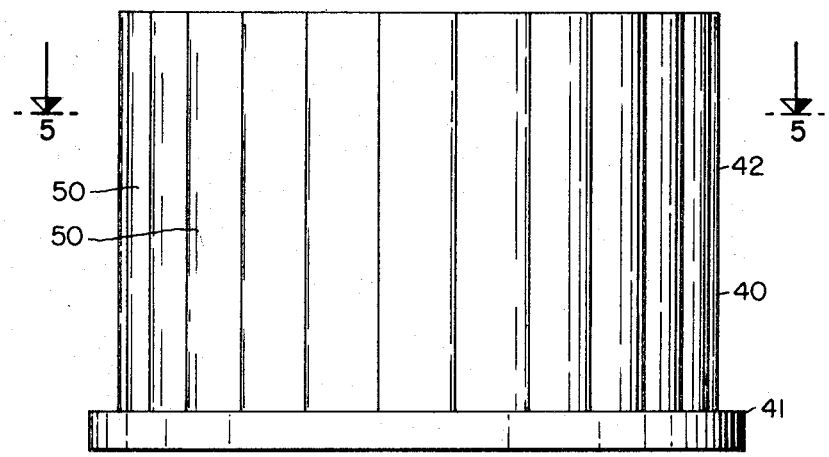
FIG. 4 is a side view of a filter element according to a second embodiment of my invention.

As shown in FIGS. 1 and 2, plastic at extrusion pressures, which may be several thousand p.s.i., is forced through a feed pipe 10 into a spinnerette head assembly 11. Pipe 10 has a flange 12 formed at its end to which a corresponding flange 13 of the cup-shaped holder 14 is fixed by the bolts 15. Holder 14 contains a large central cavity 16 below which is an end wall 17 containing passages 18. The undersurface of wall 17 has a circular recess 19 formed therein into which the passages 18 communicate. An extrusion disk 20, known as a spinnerette disk, contains the extrusion apertures or orifices 21 through which fibers are extruded. Spinnerette disk 20 is fixed below wall 17 over recess 19 by the bolts 22.

A screen 23 may be placed on end wall 17 to have the filter disk 24 of filter element 30 rest on it. A U-shaped seal 25 or the equivalent of soft metal such as aluminum prevents leakage of plastic past the periphery of disk 24. Filter element 30 has a plurality of concentric upstanding rings 26, 27, and 28 formed about a single circular element 29. As may be seen in FIG. 3, concentric circles 31, 32, and 33 of upward extending bores 34 are disposed about a central bore 35. The bores 34 and the bore 35 extend through disk 24 to the upper portions of the upstanding rings 31, 32 and 33 and circular element 29, respectively.

The entire filter element 30 is integrally formed of sintered powdered metal, preferably of stainless steel. The concentric upstanding rings 26, 27, and 28 and the central element 29 have the small clearances 37, 38, and 39 between them so that filter element 30 fills or occupies at least 45 per cent of the total volume of cavity 16 above disk 24. This is a great advantage in reducing the stagnation of material in head 11.

Any number of rings 26, 27, and 28 may be provided to fill the volume of cavity 16 and present a large filter area to inflowing material. While a center element 29 is shown, it may be omitted if desired. The structure of filter element 30 is easily fabricated and it is particularly strong so that it better resists the high pressures involved in synthetic polymer fiber extrusion.

Figure 5:
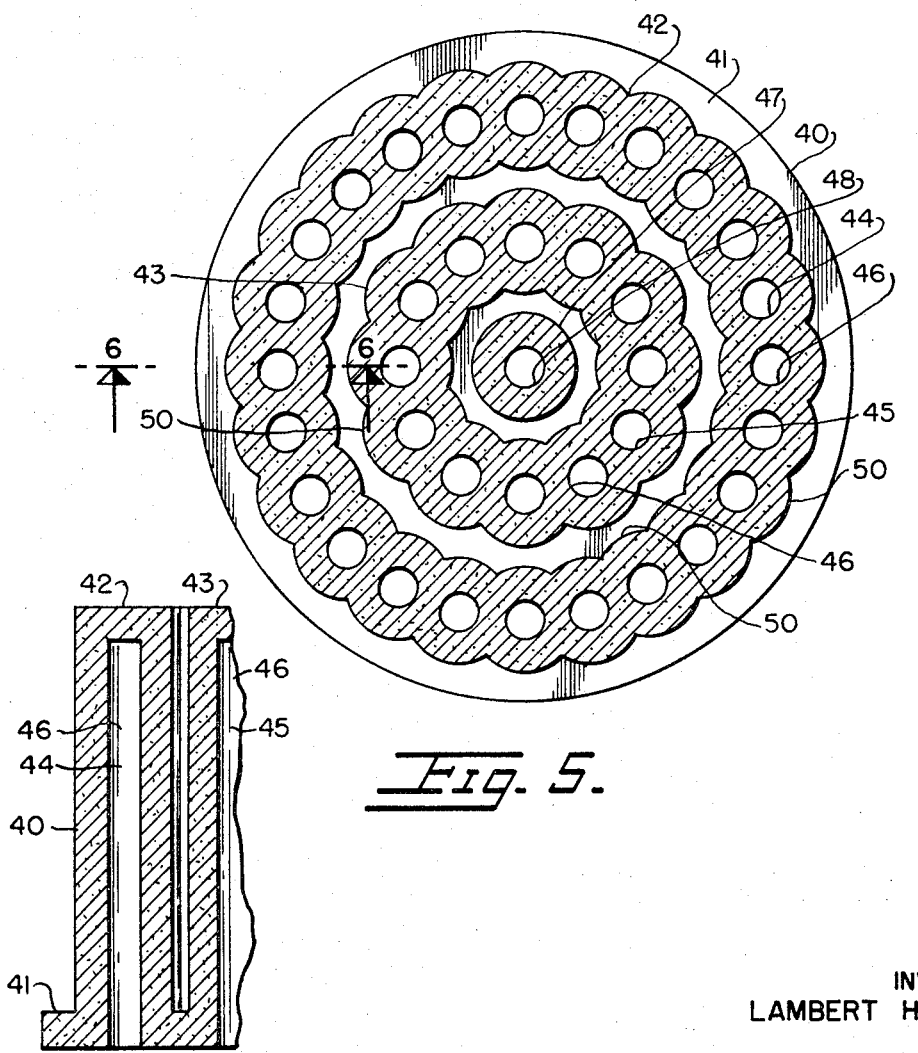
FIG. 5 is a transverse section taken on line 5—5 of FIG. 4.
Figure 6:
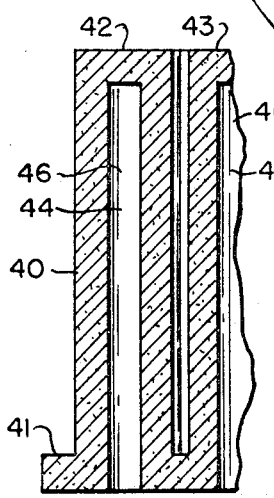
FIG. 6 is a section taken on line 6—6 of FIG. 5.

The second embodiment of this invention, which is shown in FIGS. 4-6, comprises a filter element 40 having a disk portion 41 and concentric rings 42 and 43 upstanding therefrom. Concentric circles 44 and 45 of upward extending bores 46 extend through disk 41 into the rings 42 and 43. A single central element 47 contains an upward bore 48. To provide a flow path of uniform length through the concentric upstanding rings to the bores 46, scallops 50 are formed in the inner and outer surfaces of the rings 42 and 43. The scallops 50 are formed to each extend concentrically about a bore 46. If a central element 47 is provided, its outer surface should curve with the same radius as the scallops 50 about its bore 48.

While this invention has been shown and described in the best forms known to me, it will nevertheless be understood that these are purely exemplary and that modifications may be made without departing from the spirit of the invention.

I claim:

1. A filter element for use in a spinnerette head for the extrusion of synthetic polymer fibers, said spinnerette head having a holder with means securing and sealing said filter element therein, said holder containing a large central cavity in front of said filter element, a pipe introducing plastic at extrusion pressures into the large central cavity of said holder, and a spinnerette disk containing extrusion apertures fixed to said holder below said filter element, said filter element comprising, in combination, a filter disk secured and sealed within said holder by said means, and a plurality of upstanding, concentric rings extending from said filter disk, said disk and said rings being integrally formed of porous material, said rings occupying at least 45 per cent of the volume of the central cavity of said holder, said filter element presenting an area at least twice the cross-sectional area of said central cavity to inflowing synthetic polymer material, said filter element containing upward extending circles of closely spaced outflow bores, said bores extending through said disk to the upper portions of said concentric, upstanding rings.

2. The combination according to claim 1 with the addition of a central element of porous material extending upward from the center of said disk, said concentric rings extending about said central element, said central element containing an outflow bore therein extending through said disk to the upper portion of said central element.

3. The combination according to claim 1 with the addition of scallops formed in the inner and outer surfaces of said rings about each bore therein, said scallops providing flow paths of substantially the same length from the surfaces of said rings to the bores therein.

4. The combination according to claim 3 with the addition of a central element of porous material extending upward from the center of said disk, said concentric rings being disposed about said central element, said central element containing an outflow bore extending through said disk to the upper portion of said central element, said central element having an outer surface with the same radius of curvature as said scallops.

* * * * *